United States Patent [19]

Lurie et al.

[11] Patent Number: 5,026,008
[45] Date of Patent: Jun. 25, 1991

[54] FLUID-LOOP REACTION SYSTEM

[75] Inventors: Boris J. Lurie, La Crescenta; J. Alan Schier, Tujunga; Theodore C. Iskenderian, Pasadena, all of Calif.

[73] Assignee: The United States of America as represented by the Administrator of the National Aeronautics and Space Administration, Washington, D.C.

[21] Appl. No.: 473,242

[22] Filed: Jan. 31, 1990

[51] Int. Cl.⁵ .............................................. B64G 1/28
[52] U.S. Cl. .................... 244/164; 244/165; 114/122; 114/125
[58] Field of Search ............... 244/158 R, 164, 165, 244/170; 74/572, 573; 114/124, 125, 333, 122

[56] References Cited

U.S. PATENT DOCUMENTS

| | | | |
|---|---|---|---|
| 2,856,142 | 10/1958 | Haviland | 114/125 |
| 2,952,235 | 9/1960 | Salomon | 114/125 |
| 3,048,350 | 8/1962 | Cutler | 244/1 |
| 3,424,401 | 1/1969 | Maurer | 244/1 |
| 3,452,948 | 7/1969 | Kukel | 244/1 |
| 3,716,206 | 2/1973 | Lynch | 244/1 SA |
| 3,728,900 | 4/1973 | Engelking | 74/5.5 |
| 3,730,457 | 5/1973 | Williams | 244/15 A |
| 3,733,923 | 5/1973 | Goodrich | 74/573 |
| 3,862,732 | 1/1975 | Wyatt | 244/165 |
| 3,915,416 | 10/1975 | Anderson | 244/165 |
| 3,998,409 | 12/1976 | Pistiner | 74/5.5 |
| 4,230,294 | 10/1980 | Pistiner | 244/170 |
| 4,504,033 | 3/1985 | Engelking | 244/165 |
| 4,662,178 | 5/1987 | Rasmusson | 244/165 |
| 4,776,541 | 10/1988 | Maynard | 244/165 |

*Primary Examiner*—Galen Barefoot
*Attorney, Agent, or Firm*—Thomas H. Jones; Harold W. Adams; John R. Manning

[57] ABSTRACT

An improved fluid actuating system for imparting motion to a body such as a spacecraft is disclosed. The fluid actuating system consists of a fluid mass that may be controllably accelerated through at least one fluid path whereby an opposite acceleration is experienced by the spacecraft. For full control of the spacecraft's orientation, the system would include a plurality of fluid paths. The fluid paths may be circular or irregular, and the fluid paths may located on the interior or exterior of the spacecraft.

9 Claims, 6 Drawing Sheets

FLUID-LOOP REACTION SYSTEM

The invention described herein was made in the performance of work under a NASA contract, and is subject to the provisions of Public Law 96-517 (35 USC 202) in which the Contractor has elected not to retain title.

BACKGROUND OF THE INVENTION

1. Field of the Invention

The present invention generally relates to momentum transfer systems and, more specifically, to an improved fluid actuating system for imparting movement to a body, such as a spacecraft, in three orthogonal planes.

2. Description of the Prior Art

In moving vehicles which must accurately move through three orthogonal planes, artisans have developed many types of actuating systems which initiate movement in those three planes. In the design of spacecraft, a very unique set of problems has been presented to past artisans in their design of actuating systems. First, the operating environment is one of an absence of gravity. This restricts the system design alternatives. Also, a spacecraft steering/actuating system requires a high degree of accuracy and reliability. Once a spacecraft is launched and remains in space, the actuating system must have very low maintenance requirements, since any significant maintenance or repair may not then be possible. With the ever-increasing costs associated with the development, manufacture, and launch of any spacecraft, a maximization of the potential life span of the spacecraft is particularly important. Additionally, while spacecraft instrumentation has become more compact, the amount of instruments as well as equipment, such as for testing, has increased. As a result, minimization of wasted space, or maximizing the use of available space, is always a major concern to designers.

A typical design in the past to give spacecraft pitch, yaw, and roll control has been the use of retro rockets or thrusters placed on the periphery of the exterior of the spacecraft. Retro rockets or thrusters necessarily expel a propellant mass which is carried on board as part of the original payload. In conventional systems, the propellant is not retrievable. Therefore, the life of the spacecraft is necessarily limited to the supply of propellant which was part of the original payload. This, of course, also means that a longer life span of the spacecraft requires a larger amount of propellant which will take up space that might otherwise be available to instrumentation or testing equipment. Apart from the mass and volume considerations, rockets and thrusters present undesirable force profiles to the spacecraft during maneuvering. The expulsion of a propellant produces a difficult-to-modulate force that tends to ring the spacecraft as a function of the spacecraft's natural frequency and damping. Such ringing or resonance tends to degrade the performance of instrumentation mounted in the spacecraft. Further, retro rockets or thrusters are difficult to utilize for precision pointing because of the nature of their sudden, initial expulsion of propellant.

Reaction wheels have also been utilized in the past to orient spacecraft. While reaction wheels may solve some of the problems associated with thrusters, they too have drawbacks. Their construction tends to limit their range of utility. Conventional reaction wheel systems appear suitable for momentum storage capabilities up to about 1000 Nms Beyond that, their motors (which provide a torque source) and their reaction masses need considerable support structure, which not only adds to the overall payload that must be carried by the spacecraft, but also takes up available room that might otherwise be used for instrumentation or other devices. Also, large, robust bearings must be selected for the support of very large reaction wheels in order to prevent damage occurring to the bearings where launch environment accelerations are felt by the reaction wheels. If the bearings are not adequately sized, the bearings will sustain microscopic deformations that degrade their ability to turn smoothly. In addition, larger bearings are inherently less smooth than smaller bearings of equivalent precision. Because the fluid reaction system only needs bearings for its motor and pump (if the pump is mechanical), the bearings can advantageously be quite small.

Another attempt to overcome problems associated with retro rockets is disclosed in U.S. Pat. No. 4,662,178. Therein, a rotator apparatus is provided within the spacecraft and includes a channel arranged in a stacked array of loops. The channel contains a flowable material, and the channel is moved between first and second configurations. In the first configuration, the fluid is accelerated through the channel and is then maintained at a constant velocity until the spacecraft has achieved a desired attitudinal change. At that time, the channel is moved into the second configuration wherein the fluid is decelerated. The entire rotator apparatus is attached to the spacecraft by a rotatable shaft such that rotation which the rotator apparatus produces is transmitted to the main structure of the spacecraft as a counterrotation. A major problem with this design is the large amount of area within the spacecraft and through which the rotator apparatus sweeps in operation. This takes up precious space needed for other vital equipment. The present invention does not require this volume, as it need not change configuration.

Spacecraft design technology, as well as other related technologies, still requires an improved actuating system for attitude control that minimizes the space requirements within the spacecraft, provides precise control of the spacecraft, and minimizes the need for maintenance and repair by utilizing a simple design.

SUMMARY OF THE INVENTION

The present invention overcomes the drawbacks in the prior art and achieves the present objects by imparting the angular momentum of a fluid flowing in an appropriately positioned fluid loop to a spacecraft body in order to control that body's angular orientation. The fluid circulates by a pump or a plurality of pumps. Hydraulic accumulators and valves can be added to better control the flow. Whole, independent systems may be used on the same axis for redundancy or fine control.

For maximum reaction torque, the flowing, counter-rotating mass should be at the largest feasible diameter around the spacecraft. Because the operation of the fluid loop would not critically depend upon the precise maintenance of a specified shape, the loop can be made in a variety of configurations consistent with its required distribution of mass or effect on angular momentum. The loop can be deployed as a ring that surrounds the spacecraft body, or is within the spacecraft body, or it can be laid out along a convenient regular or irregular path around the periphery of the body in the plane perpendicular to the angular momentum axis in question.

If the fluid has a sufficiently low vapor pressure, it minimizes the need for a strong, heavy tube out of which the loop is constructed. Provided the fluid is kept relatively free of bubbles and that it is relatively incompressible, its center of mass will not shift appreciably. Thus, unlike reaction wheels, the present invention does not have to be dynamically balanced.

In addition, in one preferred embodiment, the present invention occupies only a limited, peripheral circulation path. On the other hand, a rigid reaction wheel occupies the entire plane of rotation from its center and out to its diameter, and thus interferes with the mounting of other equipment. Also unlike reaction wheels, the present invention does not necessarily require a motor sized for maximum torque. The present invention also does not require a large, heavy supporting structure nor stiff, heavy hubs. Thus, the overall mass is reduced, and a greater portion of the overall mass is concentrated in a peripheral circuit. Also, the present invention does not require difficult-to-make bearings, as in reaction wheels, to withstand large forces, operate smoothly, and exert minimal frictional torque.

The objects of the present invention can best be seen from an examination of the specification, claims, and drawings hereto.

DETAILED DESCRIPTION OF THE PREFERRED EMBODIMENTS

The following description is provided to enable any person skilled in the art to which the present invention pertains, or with which it is most nearly connected, to make and use the same, and sets forth the best mode contemplated by the inventor of carrying out his invention.

While the present invention is described hereinafter in the context of a spacecraft, it should be understood that the use of a spacecraft is only for purposes of example. As will be appreciated, the present invention can be used to actuate movement of various types of devices and bodies, particularly those that must be rotated, perhaps around more than one axis.

Figure 1:
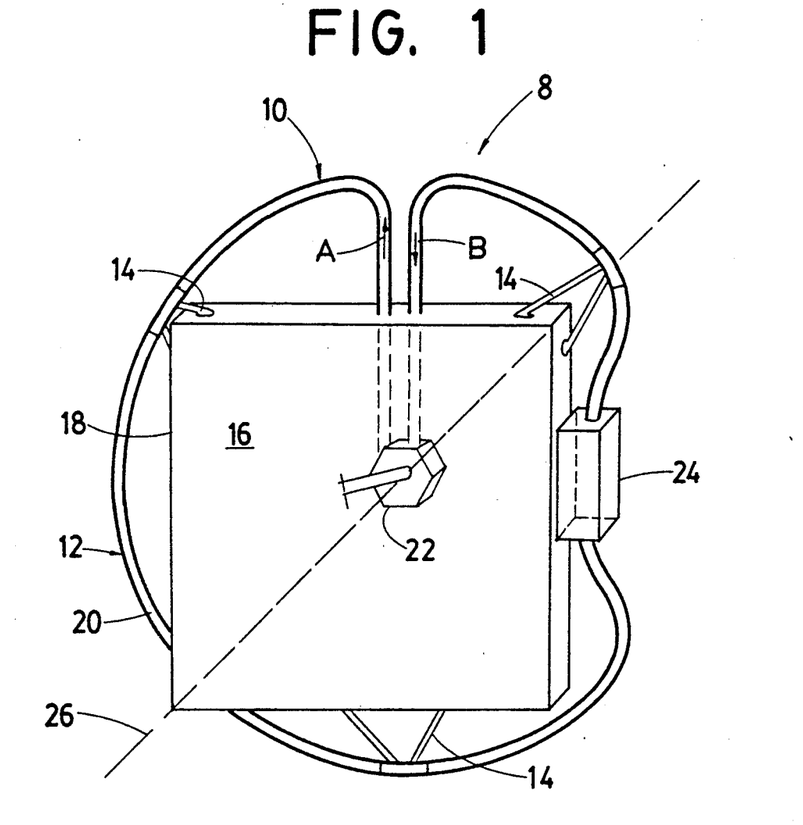
FIG. 1 is a perspective view of a fluid reaction system according to one preferred embodiment of the present invention as utilized in the context of a spacecraft.

FIG. 1 depicts a spacecraft 8 having a central body 16 and a fluid reaction system 10 thereabout. The fluid reaction system 10 includes, in this particular embodiment, a tubing portion 12 that extends from within the central body 16 to outside of the body 16 where the tubing portion 12 forms a loop configuration. The tubing 12 describes a fluid loop which, in turn, defines fluid path 20 over which a mass can travel. In this embodiment, the mass is a fluid which is further described below. While other suitable materials can be employed, the tubing 12 is preferably constructed of magnesium such that the tubing 12 can withstand the vapor pressure of the fluid therein and remain substantially rigid in configuration during operation. If the fluid loop is desirably deployed after launching of the spacecraft 8, the tubing 12 might preferably be constructed of magnesium sections, flexibly joined by plastic bellows.

The fluid reaction system 10 further includes, in this particular embodiment, three strut systems 14, each of which includes a pair of rigid, rod elements that extend from exterior, peripheral parts of the central body 16 to portions of the tubing 12. As shown in FIG. 1, the strut systems 14, in this particular embodiment, place the tubing 12 away from the central body 16 and prevent the tubing 12 from moving relative to the central body 16. Preferably, for the reasons described below, the strut systems 14 maximize the distance of the tubing 12 away from the central body 16. However, the present invention contemplates that the tubing 12 need not be in a maximized, spaced relationship from the central body 16 and, instead, may lie along and on a periphery of the central body 16. In such an arrangement, the strut systems 14 may not be necessary. It is also contemplated that the fluid loop may be contained within the body 16 and, preferably, at a maximum spaced relationship from the center of the body 16. In any embodiment, the tubing 12 and the fluid therein defines a mass centroidal axis 26 about which a torque is produced as hereinafter described.

Still referring to FIG. 1, a heat-sensitive device 24, such as an electronic assembly, is shown on a side of the central body 16 and in the fluid path 20. While the heat-sensitive device 24 is not necessary to the operation of the fluid reaction system 10, the heat-sensitive device 24 may be so placed, as shown in FIG. 1, in order to utilize the fluid reaction system 10 additionally as a heat sink or heat source.

A conventionally designed pump 22 is provided to pump fluid along the fluid path 20. Preferably, the pump 22 is located substantially at a mass center of the central body 16 in order to minimize the moment of inertia of the non-fluid reaction system 10. The present invention also contemplates that the pump 22 may be located directly in the fluid path 20, such as in the position of the heat-sensitive device 24. For example, the pump 22 may be of a positive displacement or dynamic (turbo machinery) type. The pump 22 may also use magnetohydrodynamic principles between the fluid and magnetic coils for operation.

In the particular context of a spacecraft and its operating environment, the fluid is preferably mercury. At the present time, the inventor's believe that mercury is the preferred fluid because it remains in a fluid form in space, it has a high density so that the amount of fluid and the necessary tubing 12 diameter and mass is minimized, and it has a low vapor pressure so that the structural integrity of the tubing 12 is more easily maintained. While a liquid is the preferable form of mass to move along the path 20, other forms can be used, such as plasma or gas.

Whatever medium is chosen for the mass circulating around the loop, it is preferable that the mass completely fill the tubing 12 to provide a uniform mass throughout the tubing 12. In this fashion, the fluid control system 10 remains in mass balance. Nevertheless, if voids exist within the tubing 12 and consequently cause a nonuniform distribution of mass within the tubing 12, the present invention will still work, but not as efficiently. Similarly, if the mass is contaminated in a nonuniform way, the fluid control system 10 may again be out of balance because of the absence of a uniform mass around the loop.

In the embodiment shown in FIG. 1, the pump 22 can pump the fluid out of the pump in the direction denoted by the arrow labeled "A." The fluid moves through the tubing 12 and along the fluid path 20 and reaches the temperature-sensitive device 24. There, the fluid may act as a heat sink or heat source as the fluid continues to flow through the temperature-sensitive device 24, depending upon the temperature differential between the device 24 and the fluid. The fluid continues along the fluid path 20 and reenters the pump 22 in the direction indicated by the arrow labeled "B." As can be appreciated, as the fluid moves along the fluid path 20 in a generally counterclockwise direction, as shown in FIG. 1, a torque is produced about the mass centroidal axis 26 that imparts motion to the spacecraft 8 about the axis 26 in a clockwise direction.

By way of example, to show the parameters over which the present invention can operate, the central body 16 including the pump 22 may weigh approximately 56,000 newtons and present a moment of inertia $I_{xx}$ of 8,400 Kg-m$^2$. The three strut systems 14 may weigh approximately 120 newtons. The tubing 12 may weigh approximately 30 newtons, and the fluid contained in the system 10 may weigh approximately 73 newtons. Although the fluid reaction system 10 does not provide a fluid path 20 that is exactly circular, the fluid path 20 can be generally described as having a diameter, in this particular example, of approximately 3.4 meters. With these particular parameters, and with the pump 12 accelerating the fluid at a rate of approximately 154 Kg/s$^2$, the fluid reaction system 10 can produce a torque of approximately 2800 Nm around the axis 26 and will impart an angular momentum to the central body 16 of approximately 2,800 Nms after 1 second.

It will become apparent to those skilled in the art that for a given volumetric rate of accelerated fluid, greater torque can be imparted to the spacecraft 8 by increasing the density or, in other words, the mass of the fluid traveling along the fluid path 20. The actuator inertia available for control increases linearly with the mass of the fluid, but increases as the square of the linear dimensions of the actuator structure. Hence, a smaller mass of fluid can be utilized if the diameter of the fluid loop configuration is increased. It may be desirable to deploy the tubing 12 after the spacecraft 8 is in space or alternatively, the tubing 12 may already be deployed at the time the spacecraft 8 is launched. The extent to which the diameter of the configuration is increased is essentially limited by considerations relating to a tradeoff between the inertia of the support structure and the mass of the tubing and fluid.

Figure 2:
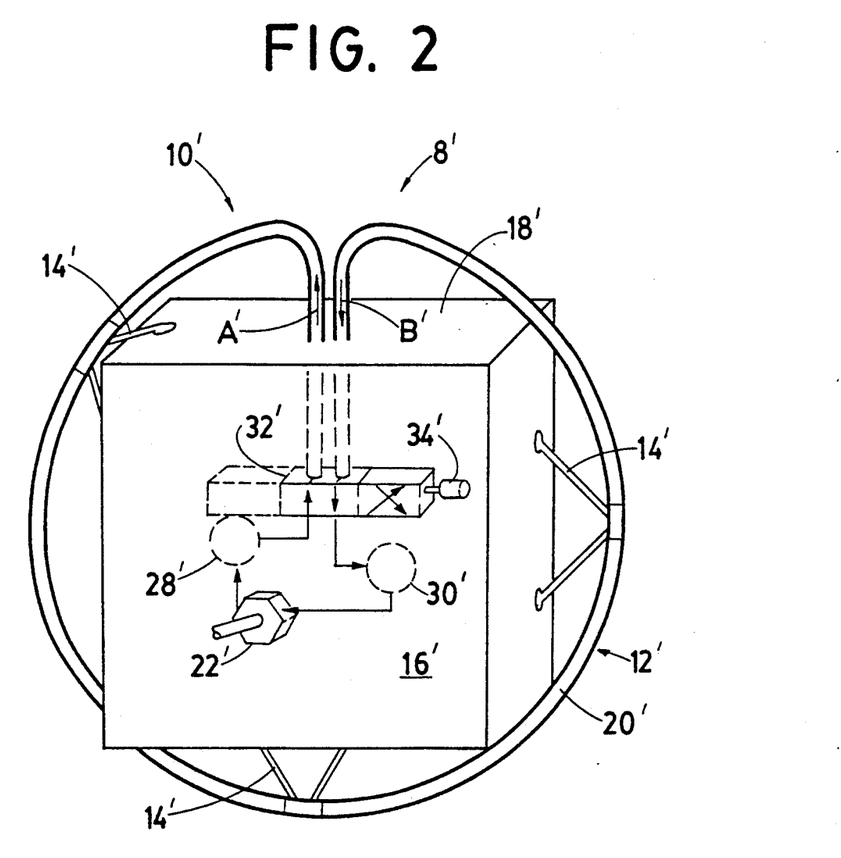
FIG. 2 is a perspective view of a second preferred embodiment of the present invention in the context of a spacecraft.

FIG. 2 shows another preferred embodiment of the present invention which seeks to accomplish more precise controlled movement of a body in comparison to that disclosed in FIG. 1. The spacecraft 8' in the second preferred embodiment, like that in the first preferred embodiment, includes a central body 16'. A fluid reaction system 10' includes a tubing portion 12' that surrounds the central body 16' and is at a spaced relationship away from the body 16' by virtue of a plurality of strut systems 14'. A pump 22' is positioned within the central body 16' to pump a fluid along a fluid path 20' in the same manner as in the first preferred embodiment. However, in the second preferred embodiment, the pump 22' does not pump the fluid directly through the tubing 12'. Instead, the pump 22' first pumps the fluid into an accumulator 28 that serves as a reservoir of fluid at a substantially constant pressure to a servo valve 32'. The valve 32' is, in this particular embodiment, a conventionally designed two-position, four-port hydraulic valve. In FIG. 2, the phantom lines of the valve 32' represent another valve position extreme that is available to a user. A pilot actuator 34' controls the position extremes of the valve 32' such that the accumulator 28' forces the fluid in the direction denoted by the arrow labeled "A'". The fluid thereby moves along the fluid path 20' and back into the valve 32, in the direction denoted by the arrow labeled "b'". The fluid then moves from the valve 32' into a low-pressure fluid reservoir 30' which provides a constant volume of fluid to the pump 22'.

The embodiment of the present invention shown in FIG. 2 provides a means of hydraulically storing energy to supply large, short-duration fluid impulses to the fluid reaction system 10. The need for large, short-duration impulses is because some applications require very high torque peaks, while maintaining a low average torque requirement. Therefore, the advantage of a stored energy system is that the pump 22 may be sized considerably smaller than necessary for peak flow demands, and that the power system may be sized for modest, continuous power delivery. Furthermore, small pump dimensions avoid mechanical disturbances which generally scale proportionally to mechanical device size.

While the tubing 12 disclosed in the above two embodiments is shown in substantially circular configurations, the present invention contemplates that the configuration can include a multitude of various forms. Those skilled in the art will appreciate that the purpose of the tubing 12 is to utilize the moving mass or fluid to produce a torque reaction in a particular plane.

Figure 3:
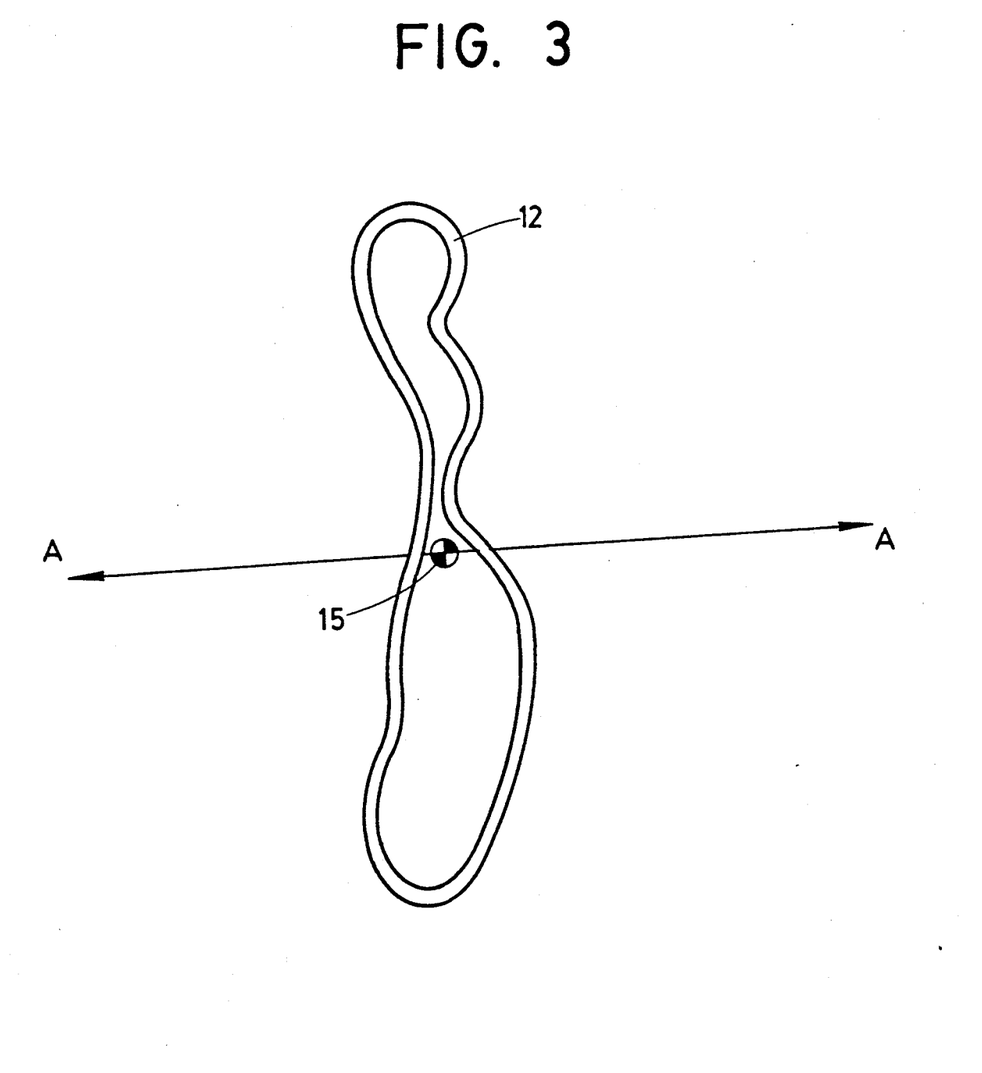
FIG. 3 is a partial, perspective view of a third preferred embodiment of the fluid reaction system wherein the tubing portion thereof is substantially noncircular.

FIG. 3 depicts a substantially noncircular configuration for a tubing 12 having a mass center 15. As depicted by the arrows labeled A—A, the embodiment shown in FIG. 3 produces a net torque reaction about an axis that can be utilized to actuate movement of a body (not shown), such as a spacecraft described above. Moreover, as long as the fluid loop produces a net torque, advantages of the present invention can be utilized. Thus, the fluid reaction system 10 according to the present invention need not have a specific configuration. This feature allows the fluid loop configuration to be adapted to particular space requirements of the body to be actuated. If, for example, the spacecraft central body 16 has a particular protrusion in it, the tubing configuration of the fluid control system can be appropriately altered to avoid spatial interference with the protrusion.

The present invention has been described above in the context of a single tubing structure in the fluid control system 10. However, as shown in FIGS. 4, 5 and 6, the present invention further contemplates that more than one fluid loop can be employed.

Figure 4:
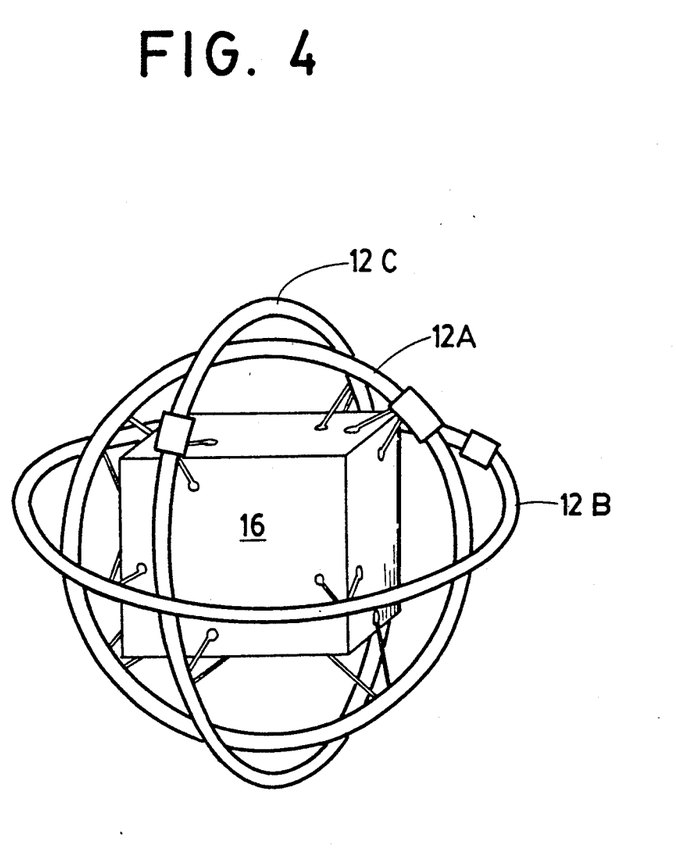
FIG. 4 is a perspective view of a fourth preferred embodiment of the present invention wherein three fluid reaction systems surround a spacecraft.

In FIG. 4, three fluid loops 12a, 12b, and 12c are employed over three perpendicular planes. In this fashion, movement of a spacecraft body 16 can be adjusted in three directions, such as that required for pitch, yaw, and roll control. In a basic approach, fluid may be pumped through a single fluid loop at a time to finally effect the desired attitude change. In a more complex approach, two or more fluid loops may be activated at the same time to provide a specific attitude change. Two fluid loops in orthogonal planes are adequate to control all available rotational degrees of freedom. Other fluid loops may be oriented parallel to the basic units to achieve redundancy of function, or to allow finer control than can be achieved with one, large unit. Of course, the maximum number of fluid loops will be limited by practical size and cost considerations.

Figure 5:
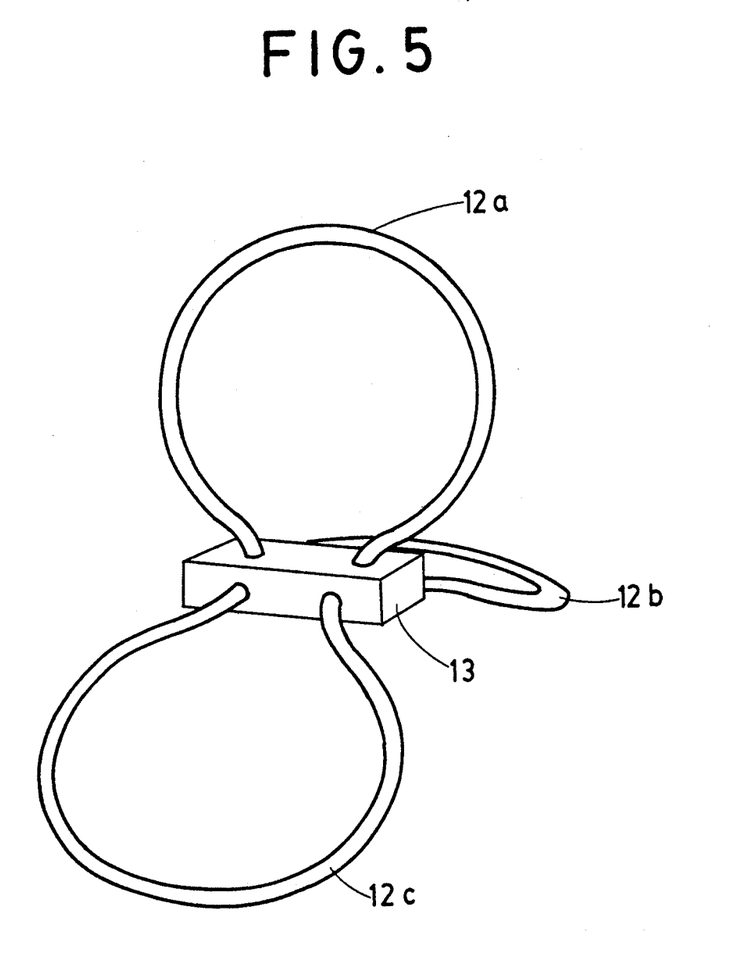
FIG. 5 is a perspective view of a fifth preferred embodiment of the present invention wherein three fluid reaction systems extend outward from a central portion.

In FIG. 5, a fifth embodiment of the present invention is shown wherein three fluid loops 12a, 12b, and 12c extend outward from a valve block 13. The three rings would likely be, but not necessarily, positioned circumferentially equidistant from one another. The fluid loops of this particular embodiment may be driven with individual pumps or, preferably, with a single pump and a valve block 13. As disclosed earlier with reference to the embodiment shown in FIG. 2, the sole purpose of the pump could be to maintain a constant pressure difference between two fluid reservoirs. The ends of each of the fluid rings would be connected to the high pressure and low pressure reservoirs and the valve block 13. Would be used to determine the flow in each of the fluid loops 12a, 12b, and 12c.

Figure 6:
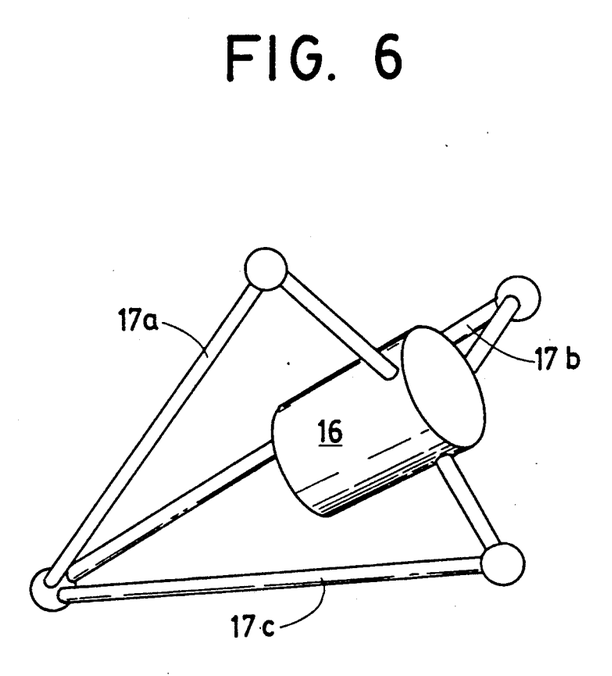
FIG. 6 is a perspective view of a sixth preferred embodiment of the present invention wherein paired elements of a tetrahedral structure are combined to provide three fluid reaction loops.

FIG. 6 depicts a sixth embodiment wherein the fluid loop structure is comprised of a tetrahedral framework. Such a structure may be particularly desirable for use as a deployable fluid ring actuator where greater reaction forces may be achieved by placing relatively small masses at a large distance. Under the embodiment of FIG. 6, the tetrahedral framework comprises three "triangular" fluid loops consisting of paired elements 17a-17c, 17a-17b, and 17b-17c.

As noted above, the present invention is not limited to spacecraft and can be employed in various environments and configurations. The fluid loop may be employed as a momentum source. For example, the momentum wheels in a control moment gyro system can be removed and fluid loops substituted in their place.

It should be understood that the above only describes specific preferred embodiments of the present invention and that modifications to the above can be effected but nevertheless come within the scope of the claims.

What is claimed is:

1. In a spacecraft, an attitude control system for imparting movement to the spacecraft, comprising:
   a main body portion having a mass center;
   fluid path means for enabling a fluid to circulate about the mass center of the main body portion, said fluid path means defining a mass centroidal axis and including a plurality of looped paths through which said fluid can circulate;
   a common centralized pumping means for pumping said fluid through said looped paths, each of the plurality of looped paths extending radially outward from the common centralized pumping means, a portion of each of the plurality of looped paths being positioned radially beyond the mass center of the main body portion.

2. The attitude control system of claim 1 wherein the plurality of looped paths are circular.

3. The attitude control system of claim 1 wherein a portion of each of the plurality of looped paths surround the exterior of the main body portion.

4. The attitude control system according to claim 1 wherein the number of said looped paths is three and wherein the three looped paths are positioned angularly equidistant from one another about the pumping means.

5. The attitude control system of claim 1 wherein said looped paths are positioned in orthogonal planes.

6. The attitude control system of claim 1 wherein the number of looped paths is three, therein a first portion of each of said three looped paths is adjacent to a first one of the other looped paths and a second portion of each of said three looped paths is adjacent a second one of the other looped paths.

7. The attitude control system of claim 1 wherein said common centralized pumping means is comprised of:
   a substantially constant-pressure fluid source that supplies said fluid to one side of said looped paths;
   a pump for pumping said fluid returning from another side of said looped paths into said fluid source; and
   a valve means for providing said fluid from said fluid source to said looped paths in short-duration impulses such that a high peak but low average torque reaction is provided to the main body portion about the mass centroidal axis.

8. The attitude control system of claim 1 wherein said common centralized pumping means is comprised of:
   a pump having an input and an output;
   a fluid accumulator having an input and an output, the input of the fluid accumulator connected to the output of the pump, the accumulator serving as a reservoir for holding said fluid at a substantially constant pressure; and
   an actuator valve connected to the output of said fluid accumulator, said actuator valve being intermittently opened to provide said looped paths in short-duration impulses such that a high peak but low average torque reaction is provided to the main body portion about the mass centroidal axis.

9. The attitude control system of claim 8 wherein said pumping means is further comprised of a low pressure fluid reservoir located between the looped paths and the input of said pump.

* * * * *